US012344182B2

(12) United States Patent
Lee et al.

(10) Patent No.: US 12,344,182 B2
(45) Date of Patent: Jul. 1, 2025

(54) AIRBAG APPARATUS FOR VEHICLE AND METHOD OF CONTROLLING OPERATION OF THE SAME

(71) Applicant: HYUNDAI MOBIS CO., LTD., Seoul (KR)

(72) Inventors: Seok Min Lee, Yongin-si (KR); Dong Young Kim, Hwaseong-si (KR); Ga Ram Jeong, Yongin-si (KR); Dong Joon Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/478,568

(22) Filed: Sep. 29, 2023

(65) Prior Publication Data

US 2024/0116472 A1  Apr. 11, 2024

(30) Foreign Application Priority Data

Oct. 6, 2022 (KR) .......................... 10-2022-0127875
Oct. 6, 2022 (KR) .......................... 10-2022-0127877

(51) Int. Cl.
*B60R 21/2334* (2011.01)
*B60R 21/231* (2011.01)

(52) U.S. Cl.
CPC .... *B60R 21/2334* (2013.01); *B60R 21/23138* (2013.01)

(58) Field of Classification Search
CPC .......... B60R 21/2334; B60R 21/23138; B60R 2021/23107; B60R 21/231
See application file for complete search history.

(56) References Cited

U.S. PATENT DOCUMENTS

| | | | |
|---|---|---|---|
| 6,109,647 A * | 8/2000 | Akaba | B60R 21/01558 280/733 |
| 9,994,181 B1 * | 6/2018 | Dubaisi | B60R 21/207 |
| 2005/0230945 A1 * | 10/2005 | Watanabe | B60R 21/231 280/733 |
| 2009/0001695 A1 * | 1/2009 | Suzuki | B60R 21/231 280/730.2 |
| 2011/0031723 A1 * | 2/2011 | Fischer | B60R 21/233 280/743.2 |
| 2019/0111882 A1 * | 4/2019 | Kim | B60R 21/237 |
| 2019/0225184 A1 * | 7/2019 | Ohno | B60N 2/34 |
| 2020/0094770 A1 * | 3/2020 | Fischer | B60R 21/231 |
| 2020/0180537 A1 * | 6/2020 | Choi | B60R 21/18 |
| 2021/0122316 A1 * | 4/2021 | Freisler | B60N 2/14 |
| 2022/0055569 A1 * | 2/2022 | Schmid | B60R 21/2338 |

FOREIGN PATENT DOCUMENTS

KR  10-2017-0002780 A  1/2017

* cited by examiner

*Primary Examiner* — Frank B Vanaman
(74) *Attorney, Agent, or Firm* — Novo TechIP International PLLC

(57) ABSTRACT

An airbag apparatus for a vehicle includes a passenger seat airbag disposed at a cockpit module of the vehicle and having a first cushion configured to deploy toward a passenger seated at a passenger seat of the vehicle; a support airbag disposed at a body of the vehicle on a lateral side of the passenger seat and having a second cushion configured to deploy toward the passenger seated at the passenger seat; and an airbag control unit configured to control individual deployment of the passenger seat airbag and the support airbag.

15 Claims, 12 Drawing Sheets

AIRBAG APPARATUS FOR VEHICLE AND METHOD OF CONTROLLING OPERATION OF THE SAME

CROSS-REFERENCE TO RELATED APPLICATIONS

The present application claims priority to Korean Patent Application Nos. 10-2022-0127875 and 10-2022-0127877, each filed on Oct. 6, 2022, the entire contents of which are incorporated herein for all purposes by this reference.

TECHNICAL FIELD

The present invention relates to an airbag apparatus for a vehicle and a method of controlling an operation of the same, and more particularly, to an airbag apparatus for a vehicle and a method of controlling an operation of the same, which are capable of effectively protecting not only a passenger normally seated in a passenger seat but also a passenger relaxedly seated in the passenger seat.

BACKGROUND

An autonomous vehicle refers to a smart vehicle to which an autonomous driving technology is applied so that the vehicle autonomously arrives at a destination even though a driver does not directly manipulate a steering wheel, an accelerator pedal, and a brake pedal. Recently, the autonomous vehicle is actively developed.

In a case in which autonomous driving is universally implemented, the driver may select a relaxed mode in which the driver may take a rest without directly driving the vehicle while the vehicle travels. In the relaxed mode, a movement, a rotation, and a posture of a seat may be variously changed to meet the passenger's request.

That is, a passenger seated in a passenger seat may select a general, normal seating posture and a relaxed seating posture in which the passenger may travel while taking a rest comfortably in the autonomous driving situation.

The normal seating state and the relaxed seating state may be defined depending on an angle of a seatback. Typically, the normal seating state may be defined as a state in which the seatback is rotated rearward within a range of 20 to 25 degrees based on a state in which the seatback is upright at 90 degrees. The relaxed seating state may be defined as a state in which the seatback is rotated rearward by 40 degrees or more.

In a situation in which the seating condition of the passenger seated in the passenger seat may be changed to the normal seating posture and the relaxed seating posture, it is difficult for an airbag apparatus in the related art provided in a vehicle to effectively protect a passenger relaxedly seated in the passenger seat. For this reason, a degree of injury to the passenger relaxedly seated in the passenger seat increases.

The foregoing explained as the background is intended merely to aid in the understanding of the background of the present invention, and is not intended to mean that the present invention falls within the purview of the related art that is already known to those skilled in the art.

SUMMARY

The present invention is proposed to solve these problems and aims to provide an airbag apparatus for a vehicle, which basically includes a passenger seat airbag configured to be deployed from a cockpit module of a vehicle and includes a support airbag configured to be deployed from a vehicle body at a lateral side of the vehicle or a belt airbag configured to be deployed from a seatbelt of a passenger seat, and a method of controlling an operation of the same, such that only the passenger seat airbag is deployed when the passenger seat passenger is normally seated in the event of an accident, and the passenger seat airbag and the support airbag are operated together or the passenger seat airbag and the belt airbag are operated together when the passenger seat passenger is relaxedly seated in the event of an accident, thereby further improving the function of protecting the passenger seat passenger as well as the function of protecting the relaxedly seated passenger.

In order to achieve the above-mentioned object, the present invention provides an airbag apparatus for a vehicle, the airbag apparatus including: a passenger seat airbag mounted in a cockpit module of a vehicle and having a first cushion configured to be deployed toward a passenger seat passenger in the event of an accident; a support airbag mounted in a vehicle body at a lateral side of a passenger seat and having a second cushion configured to be deployed toward the passenger seat passenger in the event of an accident; and an airbag control unit configured to control an operation of the passenger seat airbag and an operation of the support airbag.

The passenger seat airbag may include a first inflator fixed in the cockpit module positioned forward of the passenger seat passenger, and the first cushion may be deployed toward the passenger seat passenger positioned rearward of the first inflator.

The vehicle body at the lateral side of the passenger seat, in which the support airbag is mounted, may be a center pillar.

The support airbag may include a second inflator fixed in a center pillar of the vehicle, and the second cushion may be deployed toward the passenger seat passenger positioned at a lateral side based on the second inflator.

In a state in which the first cushion and the second cushion are deployed together, the second cushion may be positioned forward of the passenger seat passenger and the first cushion may be positioned forward of the second cushion based on the passenger seat passenger.

A rear portion of the first cushion and a front portion of the second cushion may be formed in shapes matched with each other, and the rear portion of the first cushion may be surrounded by the front portion of the second cushion.

The second cushion may include side parts at two opposite left and right sides, and the side parts of the second cushion may prevent a movement of the first cushion by pressing left and right lateral parts of the first cushion inward while surrounding the left and right lateral parts of the deployed first cushion.

The airbag control unit may receive a signal of a collision sensor and a signal of a seatback angle sensor and control the operation of the passenger seat airbag and the operation of the support airbag.

The passenger seat airbag and the support airbag may be independently operated by a control signal of the airbag control unit.

When a collision accident occurs when the passenger seat passenger is in a normal seating state, only the passenger seat airbag may be operated under the control of the airbag control unit, and only the first cushion may be deployed.

When a collision accident occurs when the passenger seat passenger is in a relaxed seating state, the passenger seat airbag and the support airbag may be operated under the control of the airbag control unit, and the first cushion and the second cushion may be deployed together.

The present invention also provides a method of controlling an operation of an airbag apparatus for a vehicle, the method including: a detection step of detecting a seating posture of a passenger seat passenger in a state in which the passenger seat passenger is seated in a vehicle; and an operation step of operating, by an airbag control unit, a passenger seat airbag mounted in a cockpit module of the vehicle and a support airbag mounted in a center pillar on the basis of the seating posture of the passenger seat passenger in the event of a collision accident, in which in the operation step, only a first cushion of the passenger seat airbag is deployed or the first cushion and a second cushion of the support airbag are deployed together.

The seating posture of the passenger seat passenger may include a normal seating posture and a relaxed seating posture detected by a seatback angle sensor.

The airbag control unit may receive a signal of a collision sensor and a signal of a seatback angle sensor and independently control an operation of the passenger seat airbag and an operation of the support airbag.

When a collision accident occurs when the passenger seat passenger is in a normal seating state, the airbag control unit may operate only the passenger seat airbag so that only the first cushion is deployed.

When a collision accident occurs when the passenger seat passenger is in a relaxed seating state, the airbag control unit may operate the passenger seat airbag and the support airbag together so that the first cushion and the second cushion are deployed together.

According to the airbag apparatus for a vehicle according to the present invention, when the passenger seat passenger is in the normal seating posture in the event of a collision accident, only the first cushion of the passenger seat airbag is deployed and protects the passenger seat passenger. When the passenger seat passenger is in the relaxed seating posture, the first cushion and the second cushion of the support airbag are deployed together and protect the passenger seat passenger, or the first cushion and the second cushion of the belt airbag are deployed together and protect the passenger seat passenger. Therefore, it is possible to effectively protect not only the passenger seat passenger in the normal seating state, but also the passenger seat passenger in the relaxed seating state.

BRIEF DESCRIPTION OF THE DRAWINGS

FIGS. 1 to 6 are views for explaining a first embodiment according to the present invention, in which FIG. 1 is a view illustrating a state in which a passenger seat airbag and a support airbag are operated together, FIG. 2 is a view illustrating a state in which only the passenger seat airbag is operated in the event of an accident in a state in which the passenger seat passenger is in a normal seating posture, FIG. 3 is a top plan view of FIG. 2, FIG. 4 is a view illustrating a state in which the passenger seat airbag and the support airbag are operated together in the event of an accident in a state in which the passenger seat passenger is in a relaxed seating posture, FIG. 5 is a top plan view of FIG. 4, and FIG. 6 is a flowchart for explaining an operation control method of the first embodiment.

FIGS. 7 to 12 are views for explaining a second embodiment according to the present invention, in which FIG. 7 is a view illustrating a state in which a passenger seat airbag and a belt airbag are operated together, FIG. 8 is a view illustrating a state in which only the passenger seat airbag is operated in the event of an accident in a state in which the passenger seat passenger is in a normal seating posture, FIG. 9 is a top plan view of FIG. 8, FIG. 10 is a view illustrating a state in which the passenger seat airbag and the belt airbag are operated together in the event of an accident in a state in which the passenger seat passenger is in a relaxed seating posture, FIG. 11 is a top plan view of FIG. 10, and FIG. 12 is a flowchart for explaining an operation control method of the second embodiment.

DETAILED DESCRIPTION

Figure 1:
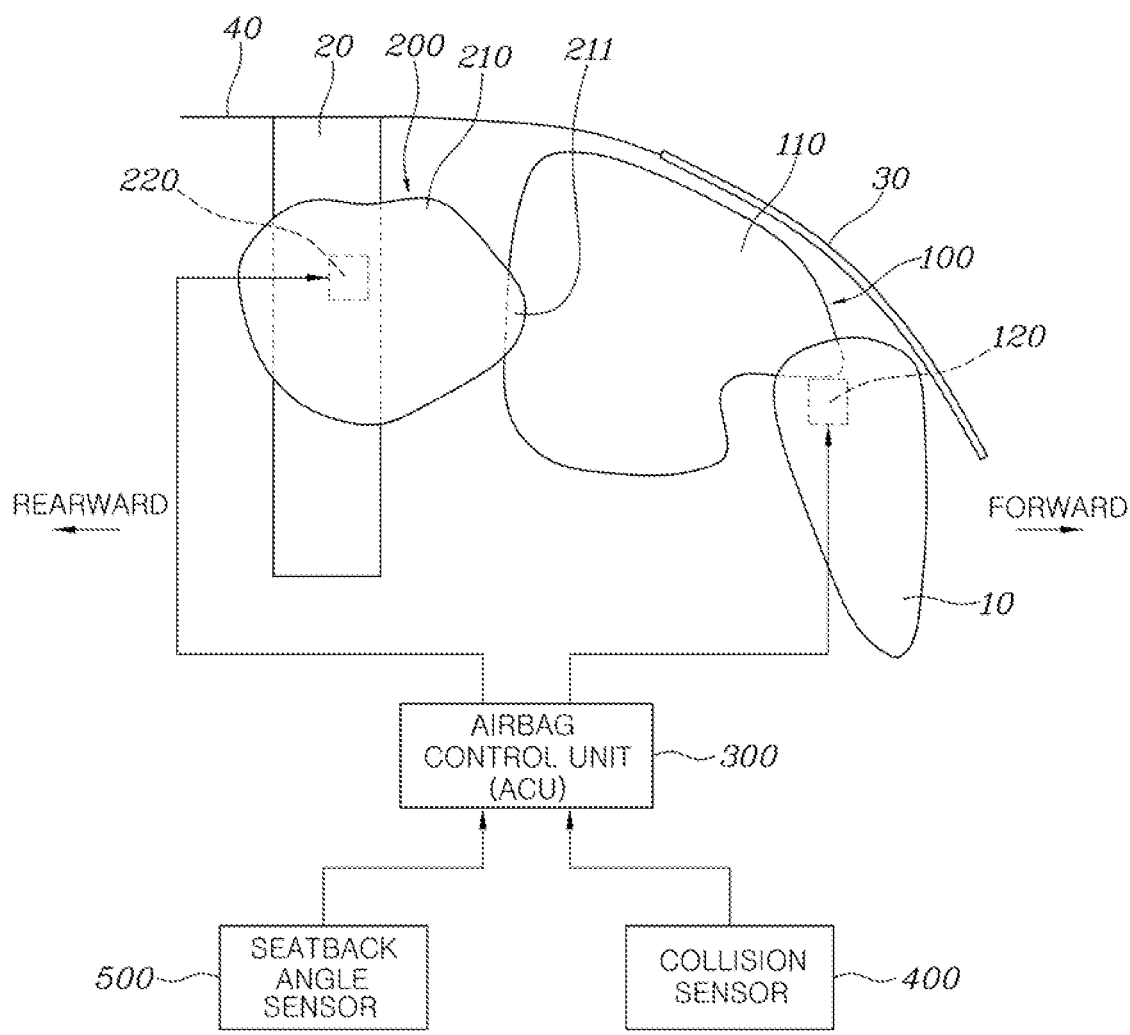

Hereinafter, embodiments disclosed in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification.

In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present invention.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements.

When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

In addition, the term "control unit" or "unit" included in the name of "motor control unit (MCU)" or "hybrid control unit (HCU)" is merely a term widely used to name a control device (controller or control unit) for controlling a particular vehicle function but does not mean a generic function unit.

A controller may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, an airbag apparatus for a vehicle and a method of controlling an operation of the same according to exemplary embodiments of the present invention will be described with reference to the accompanying drawings.

FIGS. 1 to 6 are views for explaining an airbag apparatus and a method of controlling an operation of the same of a first embodiment according to the present invention.

In addition, FIGS. 6 to 12 are views for explaining an airbag apparatus and a method of controlling an operation of the same of a second embodiment according to the present invention.

In the first embodiment illustrated in FIGS. 1 to 6 and the second embodiment illustrated in FIGS. 7 to 12, some of identical components are denoted by identical reference numerals and identical names, and some of identical components are denoted by identical reference numerals and different names.

That is, reference numerals 1, 10, 100, 110, 120, 210, 211, 220, 300, 400, and 500 respectively indicate a passenger seat passenger, a cockpit module, a passenger seat airbag, a first cushion, a first inflator, a second cushion, a side part, a second inflator, an airbag control unit, a collision sensor, and a seatback angle sensor and are equally described in the first embodiment illustrated in FIGS. 1 to 6 and the second embodiment illustrated in FIGS. 7 to 12.

Further, reference numerals 20, 30, 40, and 200 respectively indicate a center pillar, a windshield glass, a roof panel, and a support airbag in the first embodiment illustrated in FIGS. 1 to 6, reference numerals 20, 21, 30, 40, 50, and 200 respectively indicate a passenger seat, a seat cushion, a seatbelt, a windshield glass, a roof panel, and a belt airbag in the second embodiment illustrated in FIGS. 7 to 12, and thus reference numerals differently described in the first and second embodiments.

An airbag apparatus for a vehicle according to the present invention is a passenger seat airbag apparatus that may operate to protect a passenger seated in a passenger seat. In particular, the airbag apparatus is configured to effectively protect the passenger seated in the passenger seat in both a normal seating state and a relaxed seating state.

As illustrated in FIGS. 1 to 5, the airbag apparatus for a vehicle of the first embodiment according to the present invention includes a passenger seat airbag 100 disposed at (e.g., mounted in) a cockpit module 10 of a vehicle and having a first cushion 110 configured to be deployed toward a passenger seat passenger 1 in the event of an accident, a support airbag 200 disposed at a lateral side of a passenger seat, mounted in a vehicle body, and having a second cushion 210 configured to be deployed toward the passenger seat passenger 1 in the event of an accident, and an airbag control unit (ACU) 300 configured to individually control an operation (e.g., deployment) of the passenger seat airbag 100 and an operation of the support airbag 200.

The cockpit module 10 of the vehicle refers to a module that constitutes vehicle front-half indoor space system including a driver seat and a passenger seat and includes a cowl cross member, an instrument panel, a defroster & duct system, a center fascia & air vent system, a glove Box, a steering wheel & column system, and an air conditioning & wiring harness system.

The cockpit module 10 positioned forward of the passenger seat passenger 1 may be an instrument panel disposed at a point at which the glove box is positioned.

The passenger seat airbag 100 includes the first cushion 110, and a first inflator 120 disposed at (e.g., fixed in) the cockpit module 10 positioned forward of the passenger seat passenger 1.

An airbag housing is fixed in the cockpit module 10, and the first inflator 120 is fixedly installed in the airbag housing.

The first cushion 110 is deployed to protrude to the outside of the cockpit module 10 by receiving airbag gas generated by an operation of the first inflator 120. The first cushion 110 is deployed in a deployment direction toward the passenger seat passenger 1 positioned rearward of the first inflator 120 and protects the passenger seat passenger 1.

The vehicle body at the lateral side of the passenger seat, at which the support airbag 200 is mounted is a center pillar 20 positioned at a lateral side of the passenger seat passenger 1.

The support airbag 200 includes the second cushion 210, and a second inflator 220 fixed to the center pillar 20.

An airbag housing is fixed in the center pillar 20, and the second inflator 220 is fixedly installed in the airbag housing.

The second cushion 210 is deployed to protrude to the outside of the center pillar 20 by receiving airbag gas generated by an operation of the second inflator 220. The second cushion 210 is deployed in a deployment direction toward the passenger seat passenger 1 positioned at a lateral side based on the second inflator 220 and protects the passenger seat passenger 1.

The airbag control unit 300 receives a signal of a collision sensor 400 and a signal of a seatback angle sensor 500 and independently controls the operation of the passenger seat airbag 100 and the operation of the support airbag 200.

The signal of the collision sensor 400 is a criterion for determining an airbag operation, and the signal of the seatback angle sensor 500 is a criterion for determining a seating posture of the passenger seat passenger 1.

Whether the passenger seat passenger 1 is seated may be detected by a seat sensor, and the seat sensor may include a weight sensor.

Based on the state in which the passenger seat passenger 1 is seated, the seating posture of the passenger seat passenger 1 is determined by using the signal of the seatback angle sensor 500. In the event of a collision accident, the airbag control unit 300 independently controls the operation of the passenger seat airbag 100 and the operation of the support airbag 200 on the basis of the seating posture of the passenger seat passenger 1.

The seating postures of the passenger seat passenger 1 include a normal seating posture and a relaxed seating posture. The normal seating posture and the relaxed seating posture are determined on the basis of a seatback angle of the passenger seat, and the seatback angle is detected by the seatback angle sensor 500.

Typically, the normal seating posture may be defined as a state in which the seatback is rotated rearward within a range of 20 to 25 degrees based on a state in which the seatback is upright at 90 degrees. The relaxed seating posture may be defined as a state in which the seatback is rotated rearward by 40 degrees or more.

The seatback angle of the passenger seat is detected by the seatback angle sensor 500, and the signal of the seatback angle sensor 500 is transmitted to the airbag control unit 300. The airbag control unit 300 receives the signal of the seatback angle sensor 500 and the signal of the collision sensor 400 and controls the operations of the first and second inflators 120 and 220.

Figure 2:
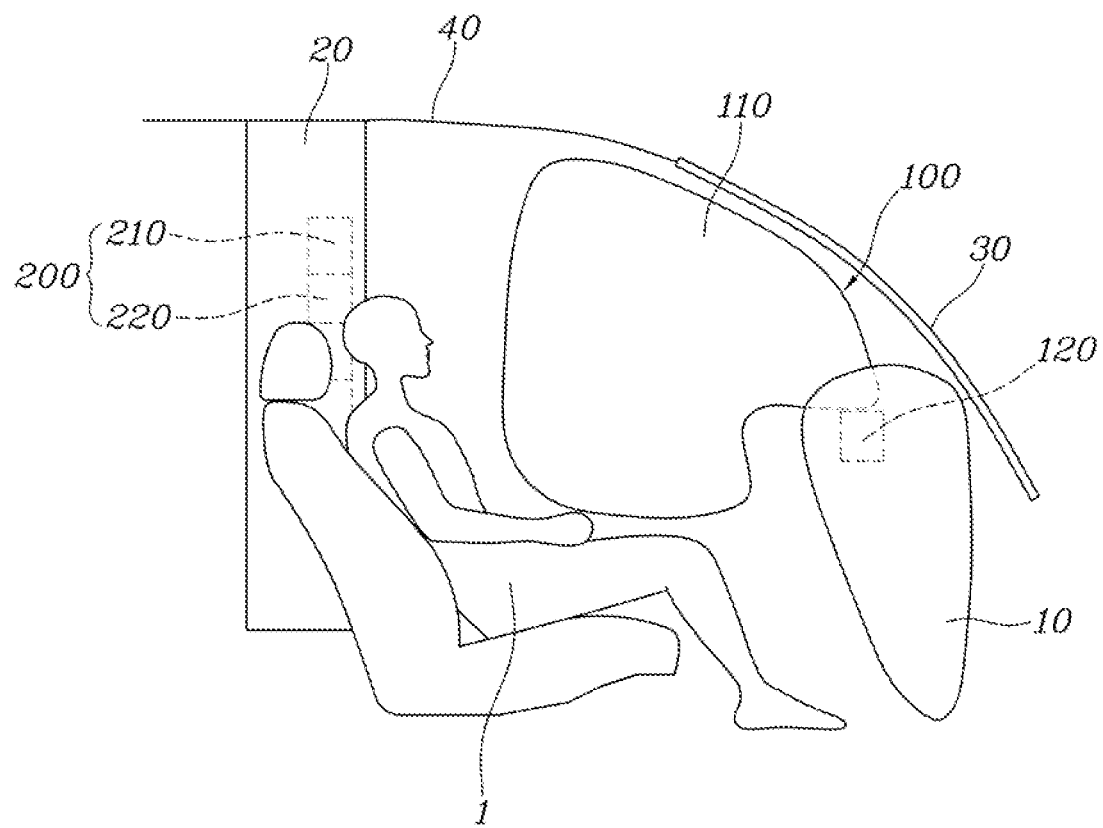
Figure 3:
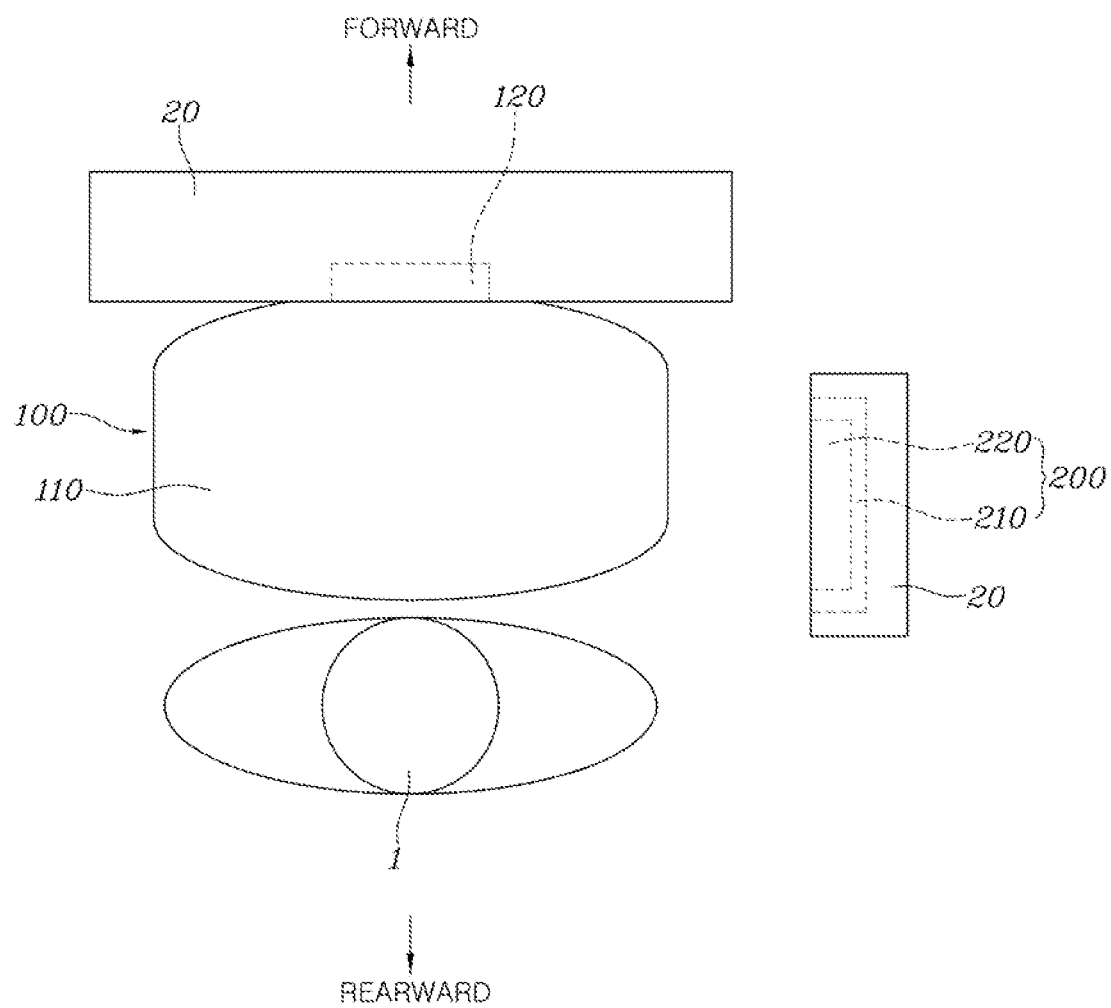

FIGS. 2 and 3 illustrate situations in which the passenger seat passenger 1 is maintained in the normal seating posture. When a collision accident occurs in the normal seating situation, only the passenger seat airbag 100 is operated under the control of the airbag control unit 300, such that only the first cushion 110 may be deployed, and the passenger seat passenger 1 may be sufficiently protected by the deployed first cushion 110.

In the normal seating posture, the passenger seat passenger 1 is positioned in a region in which the passenger seat passenger 1 may be sufficiently protected by the deployed first cushion 110. Therefore, when the passenger seat passenger 1 is in the normal seating posture, only the first cushion 110 may be deployed under the control of the airbag control unit 300 and protect the passenger seat passenger 1.

Figure 4:
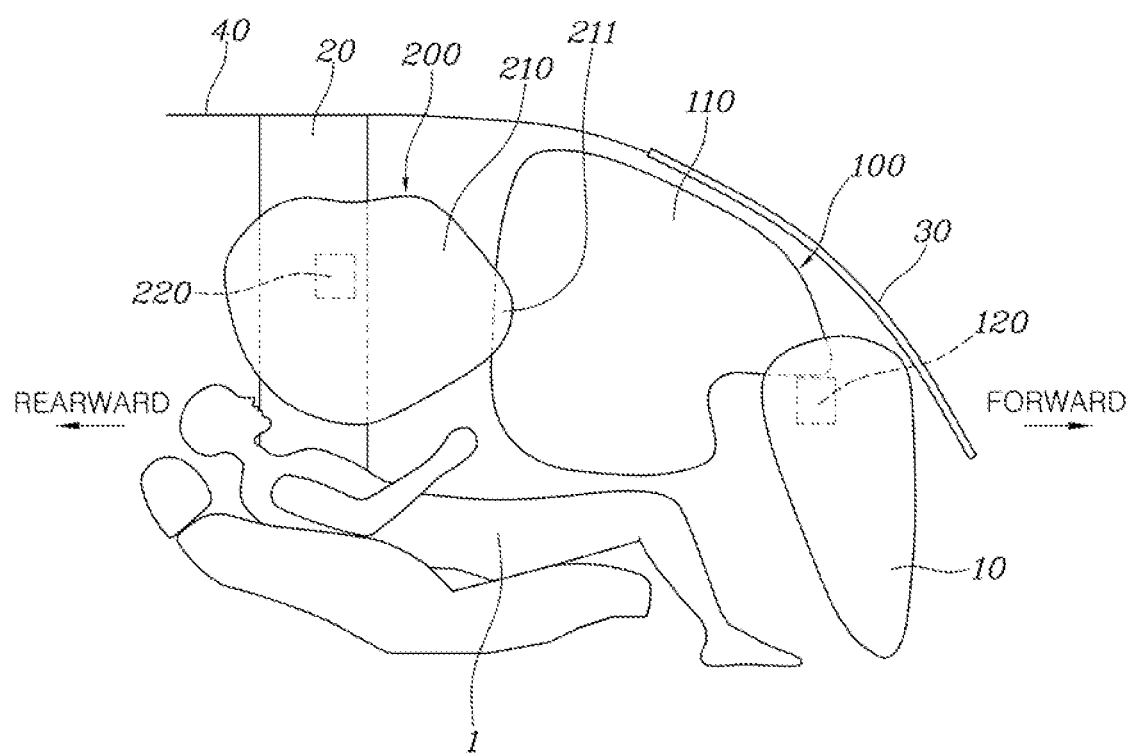
Figure 5:
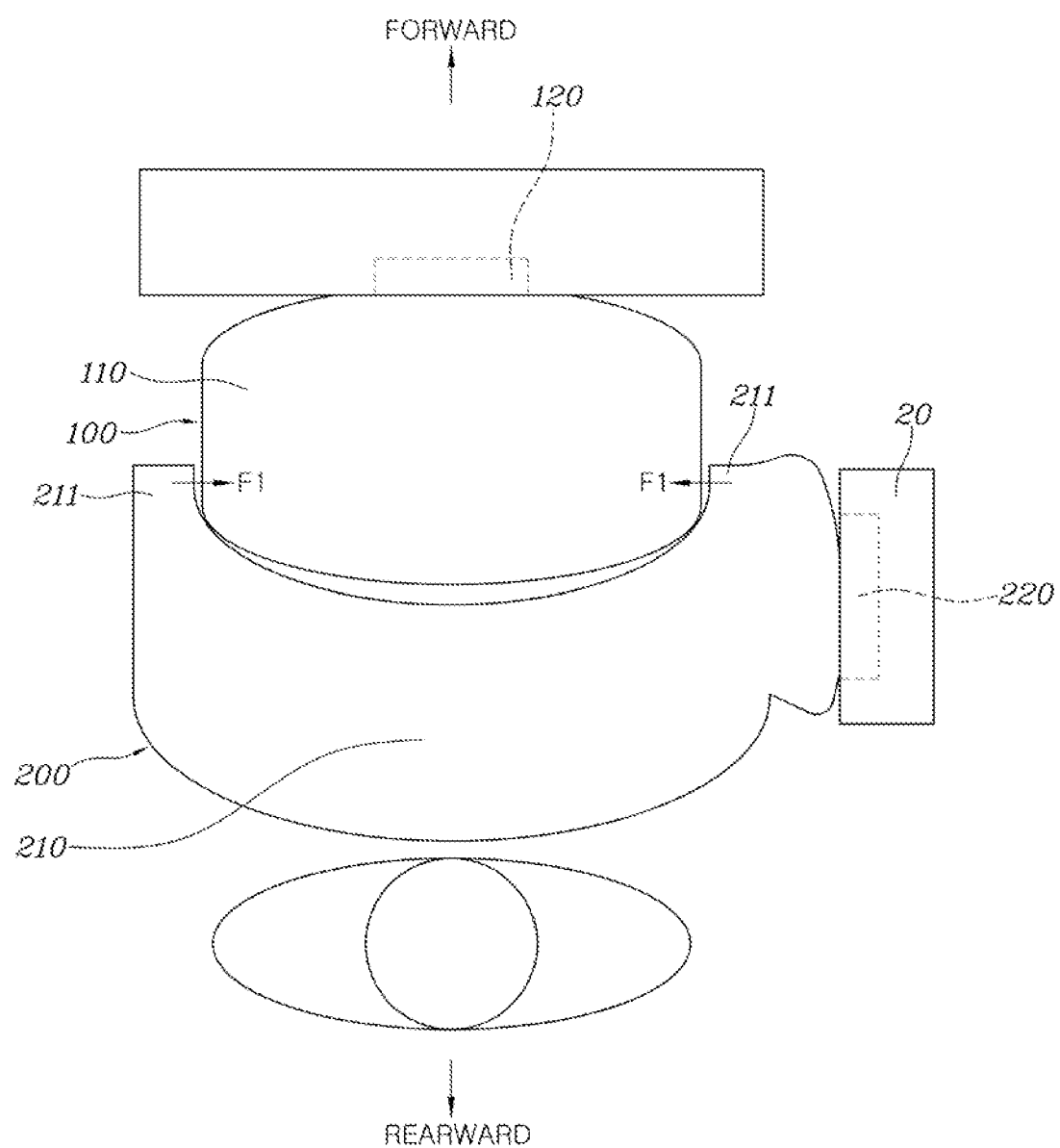

FIGS. 4 and 5 illustrate situations in which the passenger seat passenger 1 is maintained in the relaxed seating posture. When a collision accident occurs in the relaxed seating situation, the passenger seat airbag 100 and the support airbag 200 are operated together under the control of the airbag control unit 300. Therefore, the first cushion 110 and the second cushion 210 are deployed together, and the passenger seat passenger 1 is protected by the deployed first cushion 110 and the deployed second cushion 210.

Because the passenger seat passenger 1 in the relaxed seating posture is positioned outside a deployment region of the first cushion 110, the passenger seat passenger 1 cannot be sufficiently protected only by the deployed first cushion 110.

Therefore, when the passenger seat passenger 1 is in the relaxed seating posture, the first cushion 110 and the second cushion 210 are deployed together under the control of the airbag control unit 300, such that the passenger seat passenger 1 may be effectively protected by the deployed first cushion 110 and the deployed second cushion 210.

In the state in which the first cushion 110 and the second cushion 210 are deployed together, the second cushion 210 is positioned forward of the passenger seat passenger 1 first, and then the first cushion 110 is positioned forward of the second cushion 210 based on the passenger seat passenger 1.

In addition, with reference to FIG. 5, a rear portion of the first cushion 110 and a front portion of the second cushion 210 are formed in shapes corresponding to or matched with each other, such that the rear portion of the first cushion 110 is surrounded by the front portion of the second cushion 210. Therefore, the inadvertent movements of the first and second cushions 110 and 210 may be prevented, and the passenger seat passenger 1 may be much more effectively protected.

In particular, the second cushion 210 includes side parts 211 provided at two opposite left and right sides thereof. The side parts 211 of the second cushion 210 prevents the inadvertent movement of the first cushion 110 by pressing (indicated by arrows F1) left and right lateral parts of the first cushion 110 inward while surrounding the left and right lateral parts of the deployed first cushion 110, thereby much more effectively protecting the passenger seat passenger 1.

In the drawings, non-described reference numerals 30 and 40 respectively indicate a windshield glass and a roof panel.

Figure 6:
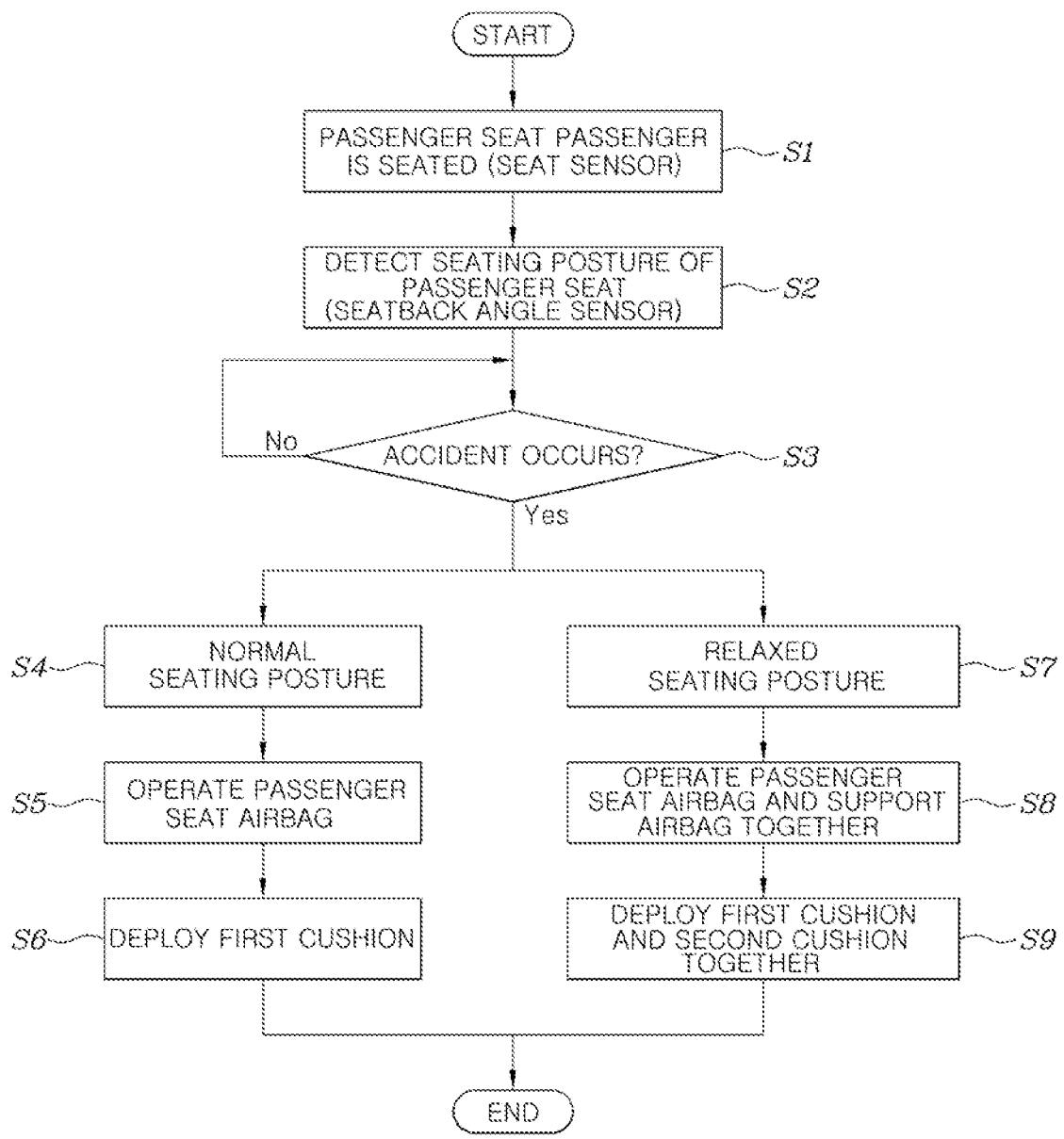
Figure 7:
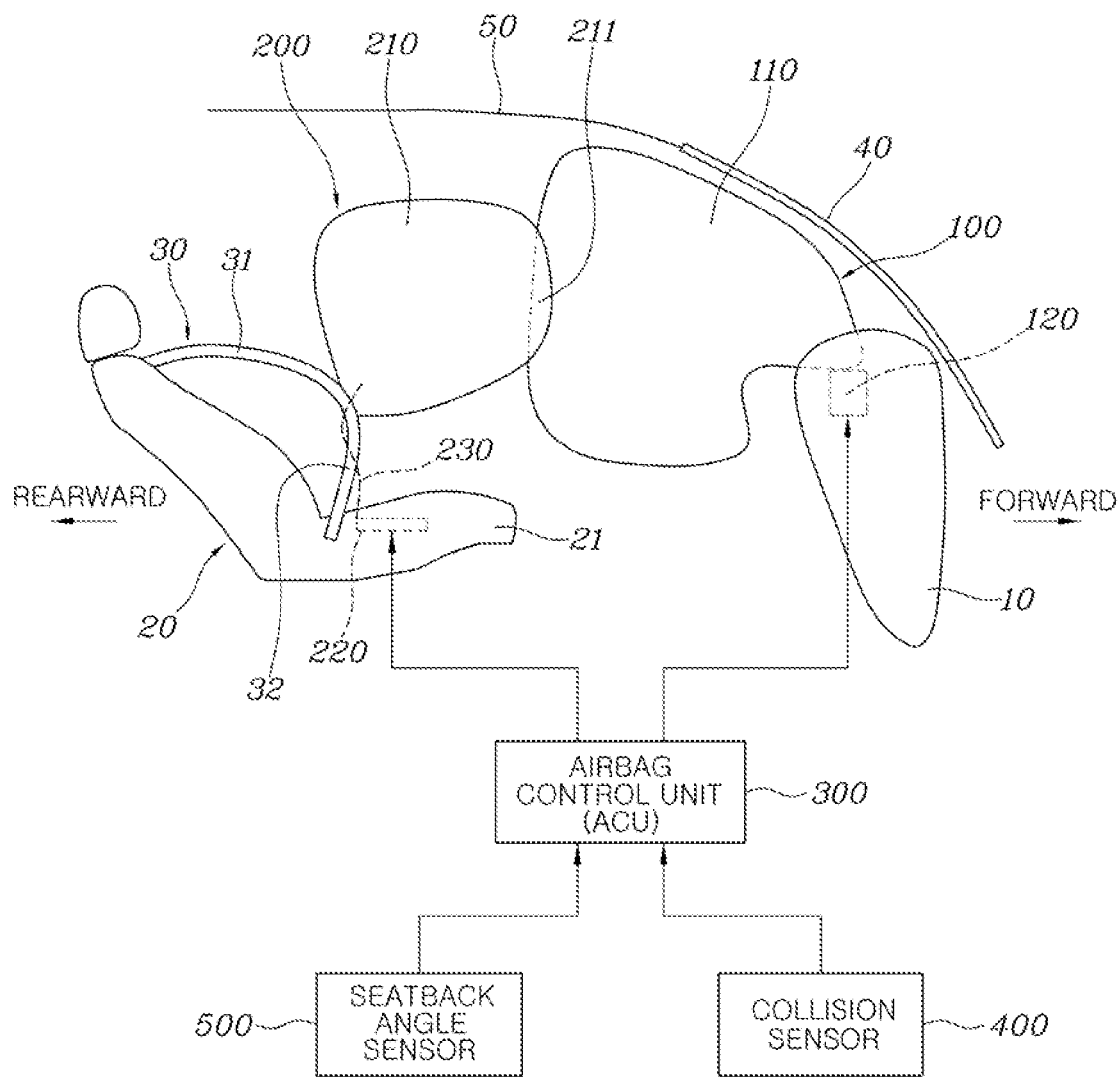

A method of controlling an operation of the airbag apparatus of the first embodiment according to the present invention will be described with reference to FIG. 6.

The method of controlling the operation of the airbag apparatus according to the present invention includes a detection step of detecting the seating posture of the passenger seat passenger 1 in the state in which the passenger seat passenger 1 is seated in the vehicle, and an operation step of operating, by the airbag control unit 300, the passenger seat airbag 100 mounted in the cockpit module 10 of the vehicle and the support airbag 200 mounted in the center pillar 20 on the basis of the seating posture of the passenger seat passenger 1 in the event of a collision accident. In the operation step, only the first cushion 110 of the passenger seat airbag 100 is deployed, or the first cushion 100 and the second cushion 210 of the support airbag 200 are deployed together.

When a logic of the present invention is started, whether the passenger seat passenger 1 is seated is detected by the seat sensor (step S1), and the seating posture of the passenger seat passenger 1 is detected by the seatback angle sensor 500 (step S2).

The seating postures of the passenger seat passenger 1 include the normal seating posture and the relaxed seating posture.

Whether a collision accident occurs is determined by using the collision sensor 400 based on the state in which the passenger seat passenger 1 is seated (step S3). When the determination result indicates that the collision accident occurs, the airbag control unit 300 independently controls the operation of the passenger seat airbag 100 and the operation of the support airbag 200 on the basis of the seating posture of the passenger seat passenger 1.

That is, when the collision accident occurs in the situation in which the passenger seat passenger 1 is in the normal seating posture (step S4), only the passenger seat airbag 100 is operated under the control of the airbag control unit 300 (step S5), such that only the first cushion 110 is deployed (step S6), and the passenger seat passenger 1 may be sufficiently protected by the deployed first cushion 110.

However, when the collision accident occurs in the situation in which the passenger seat passenger 1 is in the relaxed seating posture (step S7), the passenger seat airbag 100 and the support airbag 200 are operated together under the control of the airbag control unit 300 (step S8), such that the first cushion 110 and the second cushion 210 are deployed together (step S9), and the passenger seat passenger 1 is protected by the deployed first cushion 110 and the deployed second cushion 210.

As illustrated in FIGS. 7 to 11, the airbag apparatus for a vehicle of the second embodiment according to the present invention includes the passenger seat airbag 100 mounted in the cockpit module 10 of the vehicle and having the first cushion 110 configured to be deployed toward the passenger seat passenger 1 in the event of an accident, a belt airbag 200 mounted in a seatbelt 30 of a passenger seat 20 and having a second cushion 210 configured to be deployed forward in the event of an accident, and the airbag control unit (ACU) 300 configured to control an operation of the passenger seat airbag 100 and an operation of the belt airbag 200.

The cockpit module 10 of the vehicle refers to a module that constitutes vehicle front-half indoor space system including a driver seat and a passenger seat and includes a cowl cross member, an instrument panel, a defroster & duct system, a center fascia & air vent system, a glove Box, a steering wheel & column system, and an air conditioning & wiring harness system.

The cockpit module 10 positioned forward of the passenger seat passenger 1 may be an instrument panel disposed at a point at which the glove box is positioned.

The passenger seat airbag 100 includes the first cushion 110, and the first inflator 120 fixed in the cockpit module 10 positioned forward of the passenger seat passenger 1.

An airbag housing is fixed in the cockpit module 10, and the first inflator 120 is fixedly installed in the airbag housing.

The first cushion 110 is deployed to protrude to the outside of the cockpit module 10 by receiving airbag gas generated by an operation of the first inflator 120. The first cushion 110 is deployed in a deployment direction toward the passenger seat passenger 1 positioned rearward of the first inflator 120 and protects the passenger seat passenger 1.

The belt airbag 200 is mounted in the passenger seat 20.

The belt airbag 200 includes the second cushion 210, a second inflator 220 fixed to the passenger seat 20, and an airbag hose 230 configured to connect and extending between the second inflator 220 and the second cushion 210.

The passenger seat 20 has the seatbelt 30 that restrains an upper body of the passenger seat passenger 1 when the passenger seat passenger 1 fastens the seatbelt 30.

The seatbelt 30 is also called a webbing and includes a shoulder belt 31 configured to restrain the shoulder and chest of the passenger 1, and a lap belt 32 configured to restrain the waist and pelvis.

The second cushion 210 is mounted in the lap belt 32 of the seatbelt 30 in the passenger seat 20 and deployed forward by receiving airbag gas when the belt airbag 200 operates.

An airbag housing is fixed to a seat cushion 21 of the passenger seat 20, and the second inflator 220 is fixedly installed in the airbag housing.

The second inflator 220 may be installed at a left lower end or a right lower end of the seat cushion 21.

The airbag hose 230 transfers the airbag gas generated by the second inflator 220 to the second cushion 210 and is installed to connect the second cushion 210 and the second inflator 220.

The airbag hose 230 may be fixedly installed on the lap belt 32 by sewing or the like.

The second cushion 210 provided in the lap belt 320 is deployed to protrude forward by receiving the airbag gas, which is generated by the operation of the second inflator 220, through the airbag hose 230.

The airbag control unit 300 receives a signal of the collision sensor 400 and a signal of the seatback angle sensor 500 and independently controls an operation of the passenger seat airbag 100 and an operation of the belt airbag 200.

The signal of the collision sensor 400 is a criterion for determining an airbag operation, and the signal of the seatback angle sensor 500 is a criterion for determining a seating posture of the passenger seat passenger 1.

Whether the passenger seat passenger 1 is seated may be detected by a seat sensor, and the seat sensor may include a weight sensor.

Based on the state in which the passenger seat passenger 1 is seated, the seating posture of the passenger seat passenger 1 is determined by using the signal of the seatback angle sensor 500. In the event of a collision accident, the airbag control unit 300 independently controls the operation of the passenger seat airbag 100 and the operation of the belt airbag 200 on the basis of the seating posture of the passenger seat passenger 1.

The seating postures of the passenger seat passenger 1 include the normal seating posture and the relaxed seating posture. The normal seating posture and the relaxed seating posture are determined on the basis of a seatback angle of the passenger seat, and the seatback angle is detected by the seatback angle sensor 500.

Typically, the normal seating posture may be defined as a state in which the seatback is rotated rearward within a range of 20 to 25 degrees based on a state in which the seatback is upright at 90 degrees. The relaxed seating posture may be defined as a state in which the seatback is rotated rearward by 40 degrees or more.

The seatback angle of the passenger seat is detected by the seatback angle sensor 500, and the signal of the seatback angle sensor 500 is transmitted to the airbag control unit 300. The airbag control unit 300 receives the signal of the seatback angle sensor 500 and the signal of the collision sensor 400 and controls the operations of the first and second inflators 120 and 220.

Figure 8:
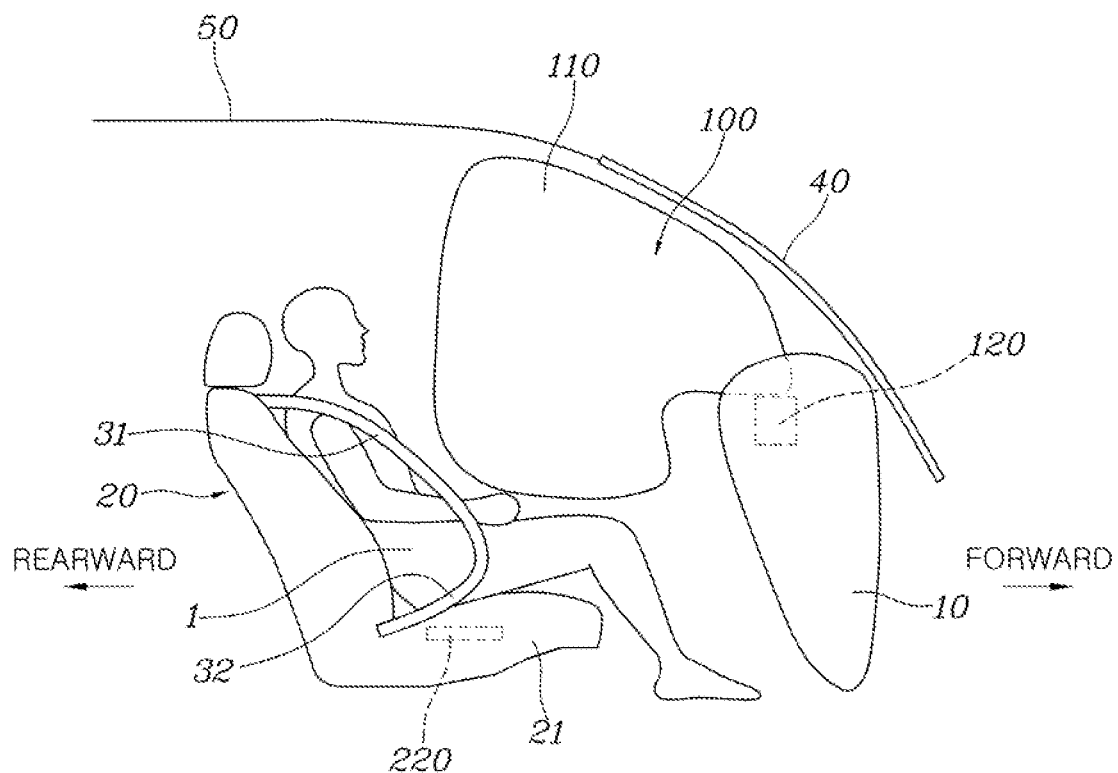
Figure 9:
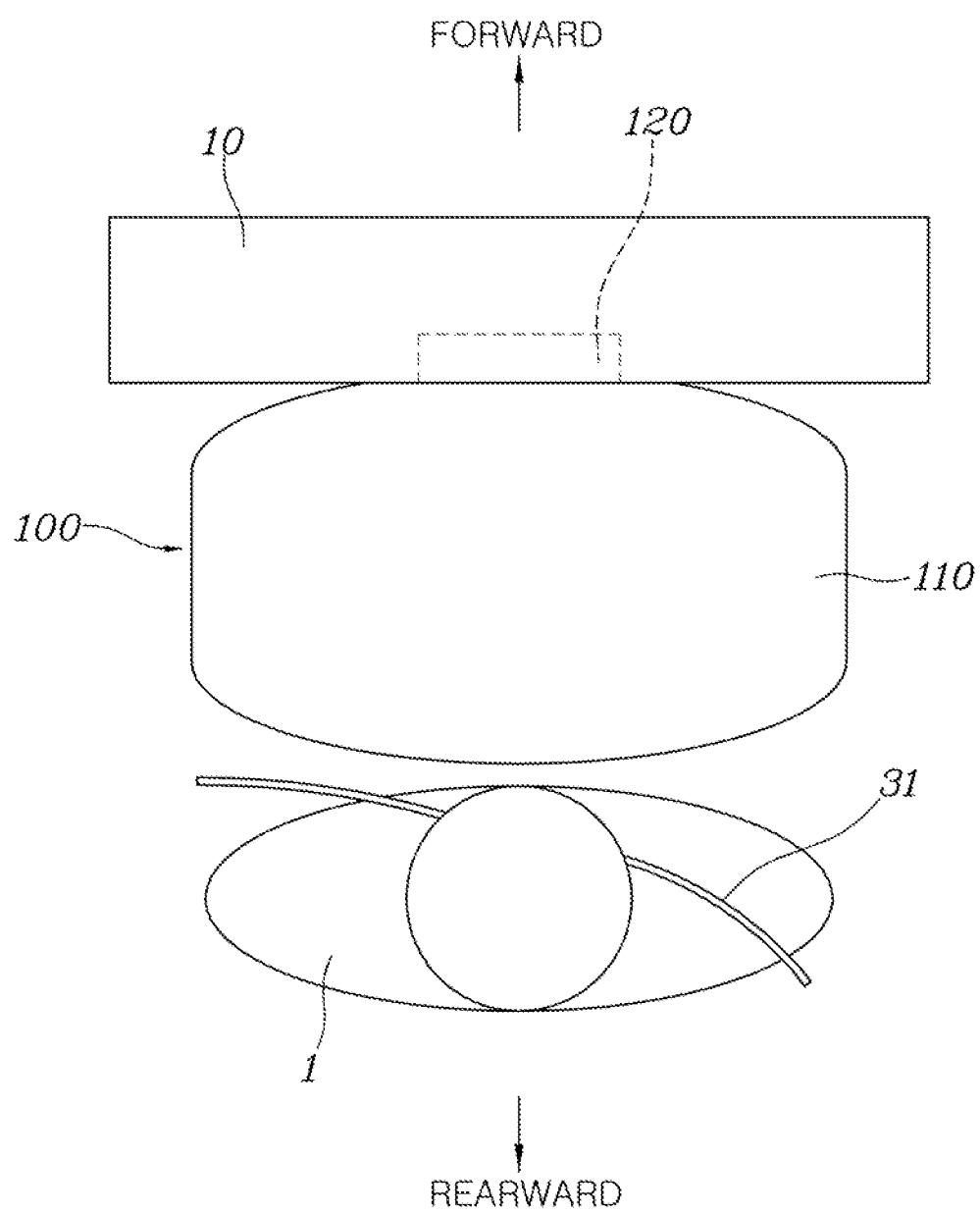

FIGS. 8 and 9 illustrate situations in which the passenger seat passenger 1 is maintained in the normal seating posture. When a collision accident occurs in the normal seating situation, only the passenger seat airbag 100 is operated under the control of the airbag control unit 300, such that only the first cushion 110 may be deployed, and the passenger seat passenger 1 may be sufficiently protected by the deployed first cushion 110.

In the normal seating posture, the passenger seat passenger 1 is positioned in a region in which the passenger seat passenger 1 may be sufficiently protected by the deployed first cushion 110. Therefore, when the passenger seat passenger 1 is in the normal seating posture, only the first cushion 110 may be deployed under the control of the airbag control unit 300 and protect the passenger seat passenger 1.

Figure 10:
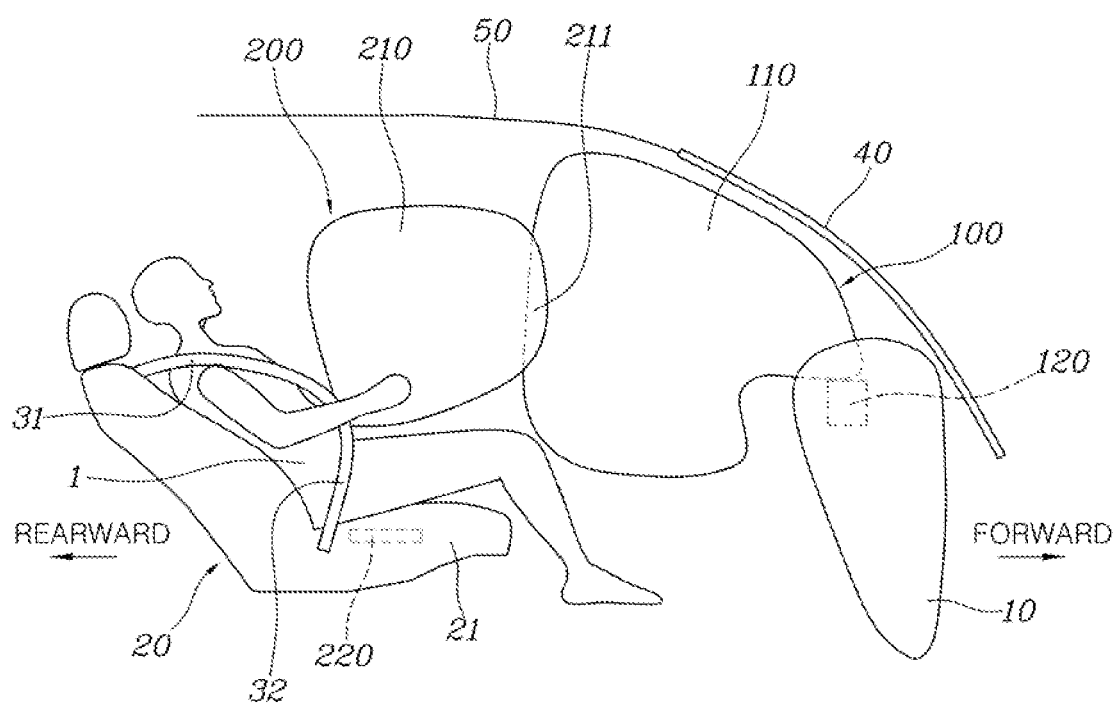
Figure 11:
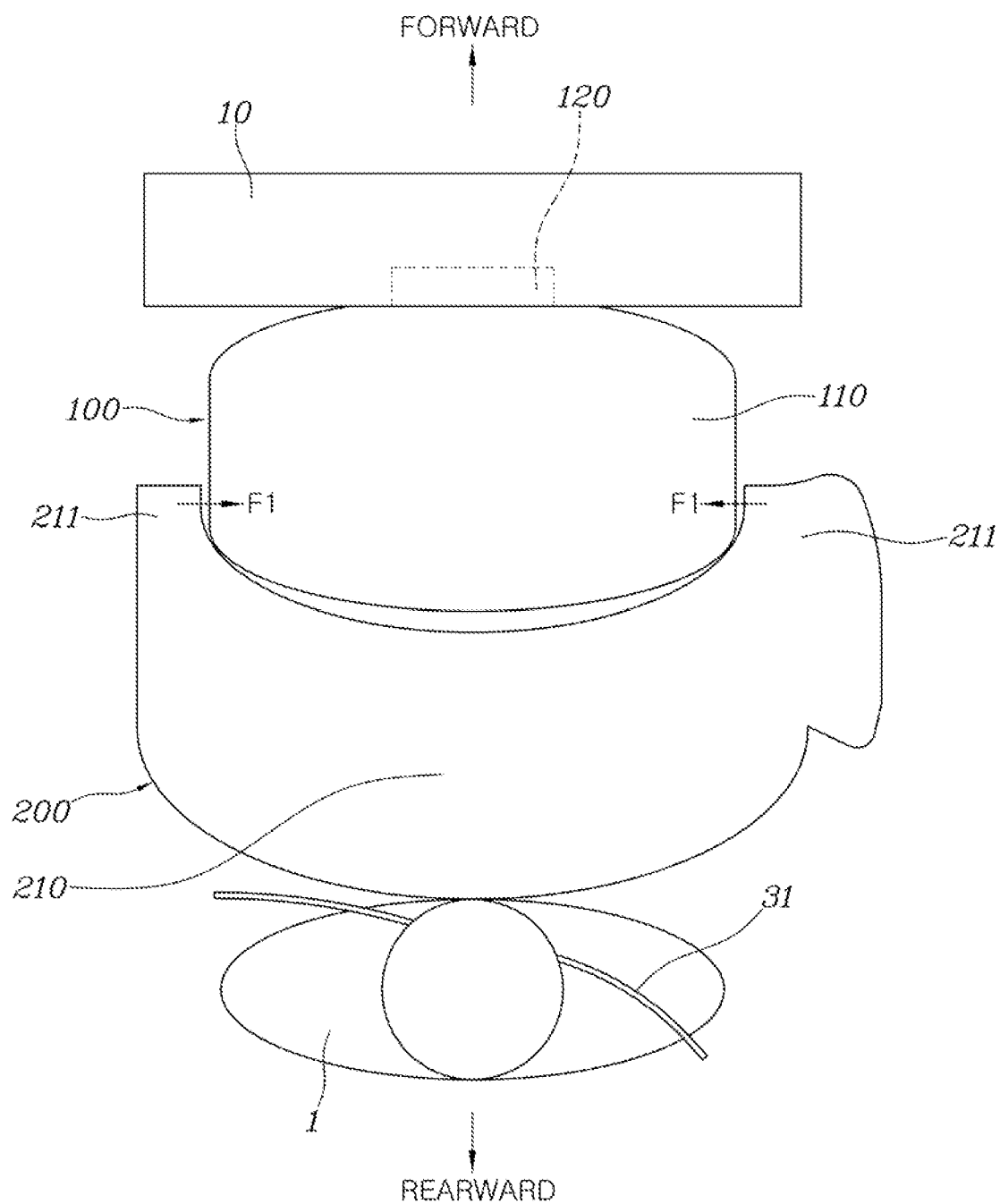

FIGS. 10 and 11 illustrate situations in which the passenger seat passenger 1 is maintained in the relaxed seating posture. When a collision accident occurs in the relaxed seating situation, the passenger seat airbag 100 and the belt airbag 200 are operated together under the control of the airbag control unit 300. Therefore, the first cushion 110 and the second cushion 210 are deployed together, and the passenger seat passenger 1 is protected by the deployed first cushion 110 and the deployed second cushion 210.

Because the passenger seat passenger 1 in the relaxed seating posture is positioned outside a deployment region of the first cushion 110, the passenger seat passenger 1 cannot be sufficiently protected only by the deployed first cushion 110.

Therefore, when the passenger seat passenger 1 is in the relaxed seating posture, the first cushion 110 and the second cushion 210 are deployed together under the control of the airbag control unit 300, such that the passenger seat passenger 1 may be effectively protected by the deployed first cushion 110 and the deployed second cushion 210.

In the state in which the first cushion 110 and the second cushion 210 are deployed together, the second cushion 210 is positioned forward of the passenger seat passenger 1 first, and then the first cushion 110 is positioned forward of the second cushion 210 based on the passenger seat passenger 1.

In addition, with reference to FIG. 11, a rear portion of the first cushion 110 and a front portion of the second cushion 210 are formed in shapes matched with each other, such that the rear portion of the first cushion 110 is surrounded by the front portion of the second cushion 210. Therefore, the inadvertent movements of the first and second cushions 110 and 210 may be prevented, and the passenger seat passenger 1 may be much more effectively protected.

In particular, the second cushion 210 includes side parts 211 provided at two opposite left and right sides thereof. The side parts 211 of the second cushion 210 prevents the inadvertent movement of the first cushion 110 by pressing (indicated by arrows F1) left and right lateral parts of the first cushion 110 inward while surrounding the left and right lateral parts of the deployed first cushion 110, thereby much more effectively protecting the passenger seat passenger 1.

In the drawings, non-described reference numerals 40 and 50 respectively indicate a windshield glass and a roof panel.

Figure 12:
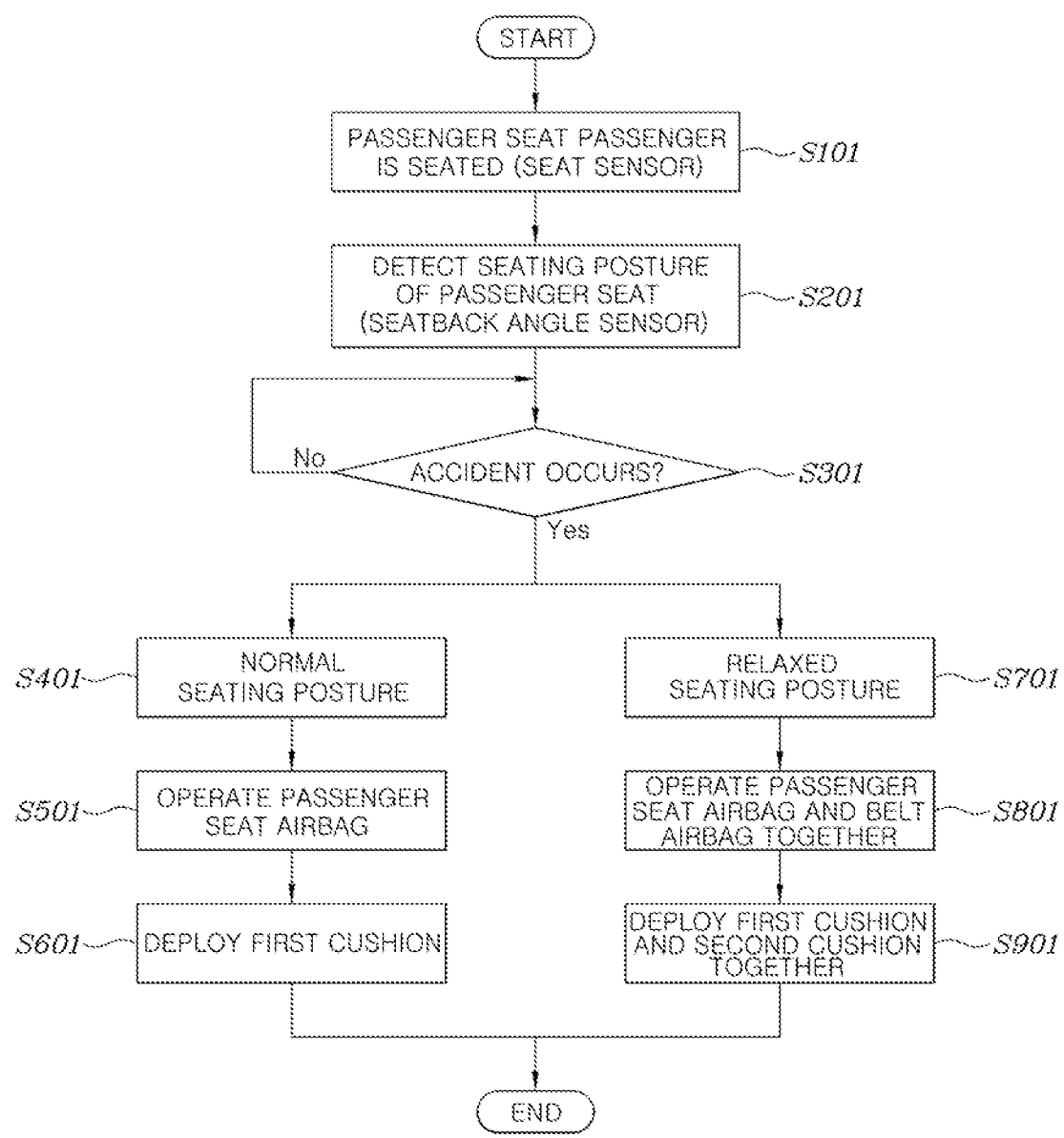

A method of controlling an operation of the airbag apparatus of the second embodiment according to the present invention will be described with reference to FIG. 12.

The method of controlling the operation of the airbag apparatus according to the present invention includes a detection step of detecting the seating posture of the passenger seat passenger 1 in the state in which the passenger seat passenger 1 is seated in the vehicle, and an operation step of operating, by the airbag control unit 300, the passenger seat airbag 100 mounted in the cockpit module 10 of the vehicle and the belt airbag 200 mounted in the passenger seat 20 on the basis of the seating posture of the passenger seat passenger 1 in the event of a collision accident. In the operation step, only the first cushion 110 of the passenger seat airbag 100 is deployed, or the first cushion 100 and the second cushion 210 of the belt airbag 200 are deployed together.

When a logic of the present invention is started, whether the passenger seat passenger 1 is seated is detected by the seat sensor (step S101), and the seating posture of the passenger seat passenger 1 is detected by the seatback angle sensor 500 (step S201).

The seating postures of the passenger seat passenger 1 include the normal seating posture and the relaxed seating posture.

Whether a collision accident occurs is determined by using the collision sensor 400 based on the state in which the passenger seat passenger 1 is seated (step S301). When the determination result indicates that the collision accident occurs, the airbag control unit 300 independently controls the operation of the passenger seat airbag 100 and the operation of the belt airbag 200 on the basis of the seating posture of the passenger seat passenger 1.

That is, when the collision accident occurs in the situation in which the passenger seat passenger 1 is in the normal seating posture (step S401), only the passenger seat airbag 100 is operated under the control of the airbag control unit 300 (step S501), such that only the first cushion 110 is deployed (step S601), and the passenger seat passenger 1 may be sufficiently protected by the deployed first cushion 110.

However, when the collision accident occurs in the situation in which the passenger seat passenger 1 is in the relaxed seating posture (step S701), the passenger seat airbag 100 and the belt airbag 200 are operated together under the control of the airbag control unit 300 (step S801), such that the first cushion 110 and the second cushion 210 are deployed together (step S901), and the passenger seat passenger 1 is protected by the deployed first cushion 110 and the deployed second cushion 210.

As described above, according to the airbag apparatus for a vehicle according to the present invention, when the passenger seat passenger 1 is in the normal seating posture in the event of a collision accident, only the first cushion 110 of the passenger seat airbag 100 is deployed and protects the passenger seat passenger 1. When the passenger seat passenger 1 is in the relaxed seating posture, the first cushion 110 and the second cushion 210 of the support airbag 200 are deployed together and protect the passenger seat passenger 1, or the first cushion 110 and the second cushion 210 of the belt airbag 200 are deployed together and protect the passenger seat passenger 1. Therefore, it is possible to effectively protect not only the passenger seat passenger 1 in the normal seating state, but also the passenger seat passenger 1 in the relaxed seating state.

While the specific embodiments of the present invention have been illustrated and described, it will be obvious to those skilled in the art that the present invention may be variously modified and changed without departing from the technical spirit of the present invention defined in the appended claims.

What is claimed is:

1. An airbag apparatus for a vehicle, comprising:
a passenger seat airbag disposed at a cockpit module of the vehicle and having a first cushion configured to deploy toward a passenger seated at a passenger seat of the vehicle;
a support airbag disposed in a body of the vehicle at a lateral side of the passenger seat and having a second cushion configured to deploy toward the passenger seated at the passenger seat; and
an airbag control unit configured to control individual deployment of the passenger seat airbag and the support airbag,
wherein, for controlling individual deployment of the passenger seat airbag and the support airbag, the airbag control unit is configured to:
detect, based on a seatback angle at which a seatback of the passenger seat is rotated rearwardly, whether the passenger seated at the passenger seat is in a first seat state or a second seat state when a collision occurs, wherein the seatback angle is greater when the passenger is in the second seat state than when the passenger is in the first seat state;
in response to detecting that the passenger is in the first seat state when the collision occurs, control the passenger seat airbag and the support airbag such that only the first cushion is deployed and the second cushion is not deployed; and
in response to detecting that the passenger is in the second seat state when the collision occurs, control the passenger seat airbag and the support airbag such that both the first and second cushions are deployed.

2. The airbag apparatus of claim 1, wherein:
the cockpit module is disposed in front of the passenger seat,
the passenger seat airbag comprises an inflator disposed at the cockpit module, and
the first cushion is configured to deploy toward the passenger seated at the passenger seat.

3. The airbag apparatus of claim 1, wherein the support airbag is disposed at a center pillar of the vehicle.

4. The airbag apparatus of claim 1, wherein:
the support airbag comprises an inflator disposed at a center pillar of the vehicle, and
the second cushion is configured to deploy toward the passenger seated at the passenger seat.

5. The airbag apparatus of claim 1, wherein:
the second cushion, when deployed, is positioned in front of the passenger seated at the passenger seat, and
the first cushion, when deployed, is positioned in front of the second cushion.

6. The airbag apparatus of claim 5, wherein:
a rear portion of the first cushion has a shape corresponding to that of a front portion of the second cushion, and
the rear portion of the first cushion is surrounded by the front portion of the second cushion.

7. The airbag apparatus of claim 5, wherein:
the second cushion comprises first and second side parts respectively disposed at two opposite sides of the second cushion, and
the first and second side parts of the second cushion are respectively configured to surround and press first and second lateral parts of the first cushion inwardly to prevent movement of the first cushion.

8. The airbag apparatus of claim 1, wherein the airbag control unit is further configured to:
receive a first signal from a collision sensor and a second signal from a seatback angle sensor, and
control, based on the received first and second signals the individual deployment of the passenger seat airbag and the support airbag.

9. The airbag apparatus of claim 1, wherein the airbag control unit is configured to independently control the passenger seat airbag and the support airbag.

10. A method of controlling an airbag apparatus for a vehicle, the airbag apparatus including (1) a passenger seat airbag having a first cushion and being disposed in a cockpit module of the vehicle and (2) a support airbag having a second cushion and being disposed at a center pillar of the vehicle, the method comprising:
in response to detecting an occurrence of a collision, detecting, based on a seatback angle at which a seatback of a passenger seat of the vehicle is rotated rearwardly, a seating posture of a passenger seated at the passenger seat; and
depending on the detected seating posture of the passenger, controlling individual deployment of the first and second cushions,
wherein controlling individual deployment of the first and second cushions includes:
in response to the detected seating posture indicating that the passenger is in a first seat state, controlling the passenger seat airbag and the support airbag such that only the first cushion is deployed and the second cushion is not deployed; and
in response to detected seating posture indicating that the passenger is in a second seat state, controlling the passenger seat airbag and the support airbag such that both the first and second cushions are deployed,
wherein the seatback angle is greater when the passenger is in the second seat state than when the passenger is in the first seat state.

11. The method of claim 10, wherein detecting the seating posture of the passenger comprises:
receiving, from a collision sensor, a first signal indicating the occurrence of the collision; and
receiving, from a seatback angle sensor, a second signal indicating the detected seating posture of the passenger.

12. An airbag apparatus for a vehicle, comprising:
a passenger seat airbag disposed at a cockpit module of the vehicle and having a first cushion configured to deploy toward a passenger seated at a passenger seat of the vehicle;
a belt airbag disposed in a seatbelt of the passenger seat and having a second cushion configured to deploy forward; and
an airbag control unit configured to control individual deployment of the passenger seat airbag and the belt airbag,
wherein, for controlling individual deployment of the passenger seat airbag and the belt airbag, the airbag control unit is configured to:
detect, based on a seatback angle at which a seatback of the passenger seat is rotated rearwardly, whether the passenger seated at the passenger seat is in a first seat state or a second seat state when a collision occurs, wherein the seatback angle is greater when the passenger is in the second seat state than when the passenger is in the first seat state;
in response to detecting that the passenger is in the first seat state when the collision occurs, control the passenger seat airbag and the belt airbag such that only the first cushion is deployed and the second cushion is not deployed; and
in response to detecting that the passenger is in the second seat state when the collision occurs, control the passenger seat airbag and the belt airbag such that both the first and second cushions are deployed.

13. The airbag apparatus of claim 12, wherein the seatbelt includes a lap belt, and the second cushion is disposed at the lap belt.

14. The airbag apparatus of claim 12, wherein the belt airbag comprises:
an inflator disposed at the passenger seat; and
an airbag hose extending between the inflator and the second cushion.

15. The airbag apparatus of claim 12, wherein the airbag control unit is further configured to:
receive (1) a first signal from a collision sensor and (2) a second signal from a seatback angle sensor; and
individually control, based on the first and second signals, the deployment of the passenger seat airbag and the belt airbag.

* * * * *